C. K. HARDING.
HYDROCARBON LIGHTING SYSTEM.
APPLICATION FILED JULY 11, 1910.
976,127.
Patented Nov. 15, 1910.
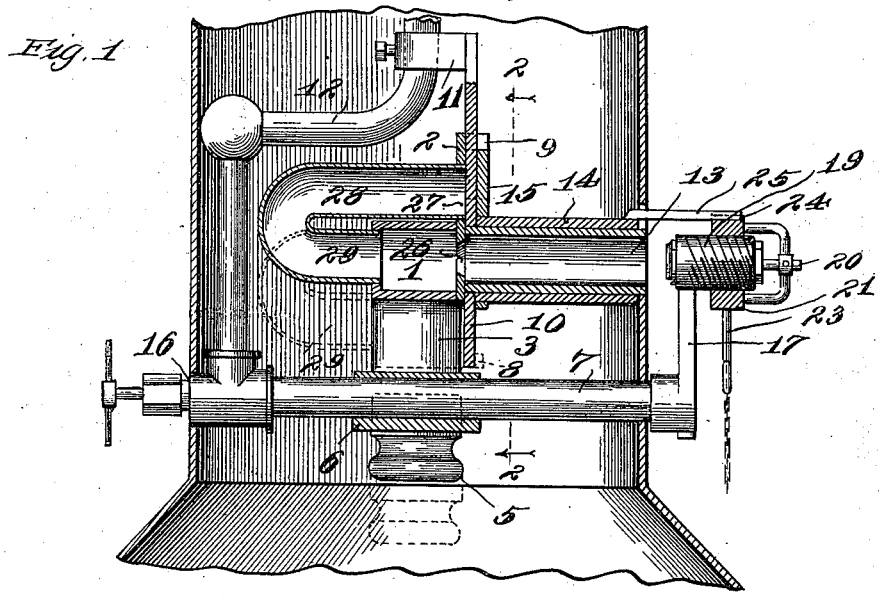
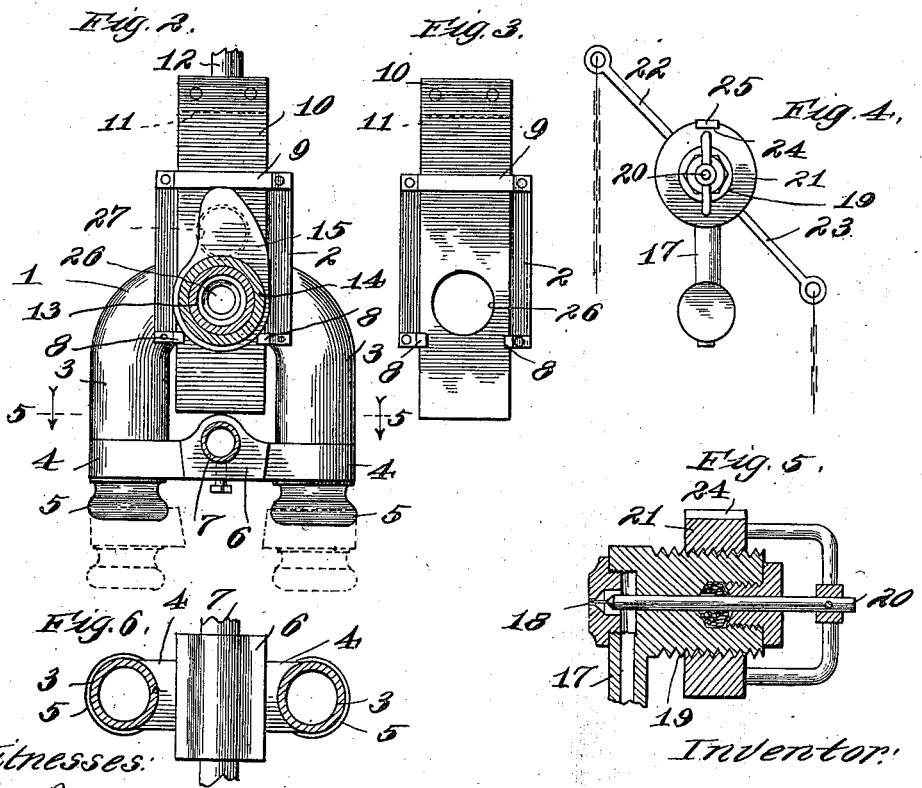
Witnesses:
Inventor:
Charles Knox Harding

UNITED STATES PATENT OFFICE.

CHARLES KNOX HARDING, OF CHICAGO, ILLINOIS.

HYDROCARBON LIGHTING SYSTEM.

976,127.      Specification of Letters Patent.    Patented Nov. 15, 1910.

Application filed July 11, 1910. Serial No. 571,481.

*To all whom it may concern:*

Be it known that I, CHARLES KNOX HARDING, a citizen of the United States, and a resident of Woodlawn, city of Chicago, county of Cook, State of Illinois, have invented certain new and useful Improvements in Hydrocarbon Lighting Systems, of which the following is a specification, which will enable others familiar with the art to make and use the same, reference being had to the accompanying drawings, which form a part thereof.

My invention relates generally to hydrocarbon incandescent lighting systems, and more particularly to gasolene incandescent lights operating on what is known as the high-low system.

The principal object of my invention is to produce an efficient light from the various grades of gasolene, in such a manner that it can be operated for long periods of time without liability of deposits or accumulations of less volatile matter being formed to prevent or interfere with its continuous use.

My invention belongs to that class of lighting devices which are adapted to maintain themselves in a generated or heated condition over long periods of time when no light is required, so as to be in readiness to supply the full amount of light required as soon as an additional supply of fuel is turned on. Heretofore considerable difficulty has been encountered, preventing the attainment of the highest efficiency and economy in lamps of this kind. Where the small flame for generating and the large flame for lighting the mantle are both produced at the same burner gauze in the mantle and their relative size governed by varying the fuel supply, the relative proportions of fuel consumption respectively between the maximum and minimum is not very great. Some lamps of this class have been specially designed for the purpose of reducing the minimum by integrating the vaporizing tube with the bunsen and other highly heated parts in metallic heat conducting relation. A lamp of this construction will produce a small flame, suitable for maintaining a lamp at the generating temperature with less fuel consumption than would be required for a lamp designed solely for the production of light with greatest efficiency.

As the best conditions of working in both the high and the low burning are not identical, according to my invention, I employ in combination in a lighting device, means for maintaining generation of the lamp most suitable for a small consumption of oil and means consisting of a modified arrangement and adjustment of the parts for the production of light, whereby the best construction for the production of light may be attained without sacrificing anything necessary to secure the maintenance of the lamp in a generated condition in the most economical manner.

In the drawings which illustrate one form of my invention Figure 1 shows a vertical central section of the moving parts of a pendant lamp. Fig. 2 is a section on line 2—2, Fig. 1. Fig. 3 is a detail elevation of the slide and clasps for holding the plain surfaced portion of the burner body in the different positions. Fig. 4 is a detail end view showing the means for regulating the flow from the jet orifice. Fig. 5 is an enlarged section of the valve. Fig. 6 is a sectional plan on line 5—5 of Fig. 2, showing the burner body and burner in its upper position and the burner close to and in metallic heat conducting relation to the vaporizing tube for maintaining generation with the minimum fuel consumption.

As shown in the drawing, the lamp is adapted to operate and permit a relative movement of its various parts so as to conform to the requirements of two more or less distinct sets of conditions. Among the desirable conditions when the lamp is burning low, the following may be mentioned: The vaporizing tube must be kept hot enough at some one point to prevent fractional distillation of the mixed hydrocarbon of which commercial gasolene is composed; the velocity of the flow of the vapor from the jet orifice should be lower and the percentage of air taken in with the mixture should be less than when used for incandescing a mantle, the Bunsen tube and passages through the metal parts of the burner body may be hotter, thus expanding and superheating the air and vapor without disadvantage as the gauze opening will permit the passage of the necessary amount even when highly expanded and the heat absorbed by the mixture will be given off at the burner and help heat the vaporizing tube. A slower velocity of flow of the mixture will permit a shorter Bunsen tube or passage to the burner and insure sufficient mixture, and the shorter passage may be through the hottest part of the burner body.

For obtaining the maximum efficiency in the production of light the vapor must be discharged from the jet at the maximum velocity obtainable. It must take in a fixed percentage of its weight of air and the mixture passed at as high a velocity as possible through the burner and burned in contact with an incandescent mantle at a sufficiently high rate to insure that the quantity of combustible reaching the mantle in a given time is sufficient to raise the temperature as high as possible. The most perfect mixture is produced by passing the air and vapor at a high velocity through rather long Bunsen tubes and passages between the jet and burner and the mixture should not be expanded and have its calorific value reduced until it has passed through the burner openings to the mantle.

As illustrated in the drawings Fig. 1, Fig. 2, Fig. 3, the moving parts of the lamp are shown in the full lines in the position of the parts when the lamp is burning low. The U-shaped body portion 1, having the plain surface side plate 2, and the downwardly extending tubular arms 3 and the inwardly extending heat conducting pieces 4, carries at the lower end of the tubular arms the burner tips 5 of the usual construction, having perforations in the lower surface through which the gas mixture passes to the mantles and being adapted on its outer circumference to hold an inverted mantle which may be tied on or secured in any suitable manner. When the lamp is burning in this position the flame will be small and close to the burner perforations and may produce a small amount of light from the upper portion of the mantle but its main function is to keep the burner tips and heat conducting pieces 4— at a high temperature. In the position shown the heat conducting pieces 4 are in metallic contact with the heat collecting metal block 6— surrounding the vaporizing tube 7. The plain surfaced plate 2 on the burner body 1— carries the clasps 8— 8— at its lower end and the clasp 9— extending across its upper end which surrounds and engages the plain surfaced rectangular slide 10—. The slide 10— is rigidly attached at its top to the projecting piece 11— which is carried by the main central oil supply pipe 12— which is a continuation of the supporting fixture. The slide 10— also carries the Bunsen tube 13— which passes through its middle portion at right angles. The Bunsen tube 13— is surrounded by a rotating sleeve 14— which carries a cam 15— the outer surface of which engages the lower surface of the clasp 9— which supports the plate 2— and the movable parts connected therewith.

In the operation of the lamp the liquid hydro-carbon enters through the pipe 12— and passes through the valve 16— into the vaporizing tube 7— where it is converted into vapor and the vapor passes through the lateral arm 17— to the jet orifice 18—. The discharge from the jet orifice 18— is controlled by inserting or withdrawing a metallic wire about 1/2000 of an inch smaller than the internal diameter of the orifice. This wire is carried at the end of a rod 20— which extends through suitable packing devices and is engaged by a bracket extending from a rotatable nut 21—. The nut 21— is internally screw threaded to engage with external screw thread on the valve body 19— having a very rapid pitch so that approximately a quarter of a revolution will produce motion enough to insert or withdraw the wire from the orifice. The nut 21— is also provided with the arms 22— 23— extending radially and carrying chains depending from their respective ends so that by pulling down on one of the chains the nut 21— is rotated to the right and the wire is inserted in the orifice thus reducing the flow. The nut also has a notch 24— in its circumference and the rotating sleeve 14— has a projection 25— extending from its surface and adapted to engage the sides of the notch 24— so that a partial rotation of the nut 21— carries the projection 25— and the sleeve 14— a part of the revolution around its axis and rotates the cam 15— so as to raise the moving parts of the burner to the highest position and bring the heat conducting pieces 4— into metallic contact with the heat collecting block 6— surrounding the vaporizing tube. This places these various moving parts in the position best adapted for low burning. The interior of the burner body in this position communicates with the Bunsen tube through the lower restricted orifice 26— in the plate 2— of the burner body and this in effect helps make the effective diameter of the Bunsen tube much more nearly correspond to the diminished quantity of the mixture being used and prevents an over supply of air which would tend to cause the flame to flash back through the perforations of the burner which perforations may therefore be made as large as it is desired to have them when the lamp is to produce the maximum light.

It will be readily understood that in the position shown most of the heat produced at the burners will be effectively communicated to the vaporizing tubes as a result of the metallic heat conducting relations of the parts.

The very materially reduced quantity and velocity of flow of the mixture through the burner body will enable the mixture to acquire a considerable amount of heat in passing through the burner body, but this superheating will coöperate and not interfere with the operation in this position. It will be readily understood that with the operative parts in the position just described the opposite chain attached to the arm 22— being pulled it will rotate the nut 21— in the opposite direction, remove the needle from the orifice, permit the full flow of oil, rotate the sleeve 14— and the cam 15— and lower the burner body and its parts to the positions shown in the dotted lines. This will break the metallic connections with block 6— and increase the distance between the vaporizing tube and the burners which will allow for the excess of the heat produced and the much higher temperature associated with the production of the light. In the lower position the opening 27— in the upper part of plate 2— shown by dotted circle in Fig. 2 will be brought down opposite the end of the Bunsen tube 13—. The opening 27— communicates with the tube 28— approximately the diameter of the Bunsen tube and extends some distance beyond the burner body and through a return bend and communicates with the interior of the burner body 1— through the tube 29—. In this position therefore the passages through the burner body will be naturally lengthened in a way to retain the full flow of the Bunsen tube and increase its effective length and mixing capacity.

Having now described my invention and illustrated one method by which it may be carried out, what I claim is—

1. In a device of the character described, comprising a vaporizer and a burner, a jet orifice and means for controlling the flow of vapor therefrom, a Bunsen tube and channels leading therefrom to the burners for conveying the mixture of vapor and air from said bunsen to said burner and means for simultaneously changing the flow of the vapor and the length of the passages from the Bunsen tube to the burners.

2. In a device of the character described comprising a vaporizer and a burner, a jet orifice and means for controlling the flow of vapor therefrom, a Bunsen tube and two channels leading therefrom to the burners for conveying the mixture of vapor and air from said bunsen to said burners and means for bringing either one of the two passages into the path of the flow of the mixture between the bunsen and the burner.

3. In a device of the character described comprising a vaporizer and a burner, a jet orifice and means for controlling the vapor therefrom, a Bunsen tube and channels leading therefrom to the burner for conveying the mixture of the vapor and air from said bunsen to said burners and means for simultaneously changing the flow of the vapor and the sectional area of the passages from the Bunsen tube to the burners.

4. In a device of the character described comprising a vaporizer and a burner, a jet orifice and means for controlling the vapor therefrom, a Bunsen tube and channels leading therefrom to the burner for conveying the mixture of vapor and air from said bunsen to said burners and means for simultaneously changing the flow of the vapor and the length and area of the passages from the Bunsen tube to the burners.

5. In a device of the character described comprising a vaporizer and a burner and means for bringing the burner into close metallic heat conducting relation to said vaporizer, a jet orifice and means for controlling the flow of vapor therefrom, a Bunsen tube and channels leading therefrom to the burners for conveying a mixture of vapor and air from the said bunsen to said burners and means for changing the heat communicating relation of the burners and vaporizer and simultaneously changing the flow of the vapor from the jet orifice.

6. In a device of the character described consisting of a vaporizer and a burner in adjustable heat communicating relation to each other, a jet orifice and means for controlling the flow of vapor therefrom, means for simultaneously reducing the flow of the vapor and adjusting the burner into closer heat communicating relation to the vaporizer.

7. A device of the character described consisting of a vaporizer and a burner in adjustable heat communicating relation to each other, a jet orifice and means for controlling the flow of vapor therefrom, a Bunsen tube and a longer channel and a shorter channel leading therefrom to the burners for conveying a mixture of vapor and air from the said bunsen to the said burners and means for introducing the said longer channel into the path of flow of the mixture from the bunsen to the burners and simultaneously cause motion that will increase the distance of the burners from the vaporizing tube and increase the flow of vapor from the orifice.

8. In a device of the character described the combination of means for maintaining generation consisting of a restricted jet orifice, a relatively shorter and smaller passage leading from the Bunsen tube to the burners, said burners being located in relatively close heating relation to a vaporizing tube and means for producing light from an incandescent mantle comprising a relatively open jet orifice and a longer and larger passage leading from the Bunsen tube to the burners, the said burners being farther removed from said vaporizing tube, and means for automatically and simultaneously adjusting the device for the maintenance of generation or production of light.

In testimony whereof I have signed my name to this specification in the presence of two subscribing witnesses this 9th day of July 1910.

CHARLES KNOX HARDING.

Witnesses:
ALICE M. FAIRCHILD,
Mrs. W. C. WATERBURY.